Oct. 27, 1942.   H. A. G. HARWOOD   2,300,046
APPARATUS FOR CLEANING POTATOES
Filed Jan. 13, 1940   2 Sheets-Sheet 1

Inventor
Harry A. G. Harwood
by William C. Linton
Attorney

Oct. 27, 1942.  H. A. G. HARWOOD  2,300,046
APPARATUS FOR CLEANING POTATOES
Filed Jan. 13, 1940  2 Sheets-Sheet 2
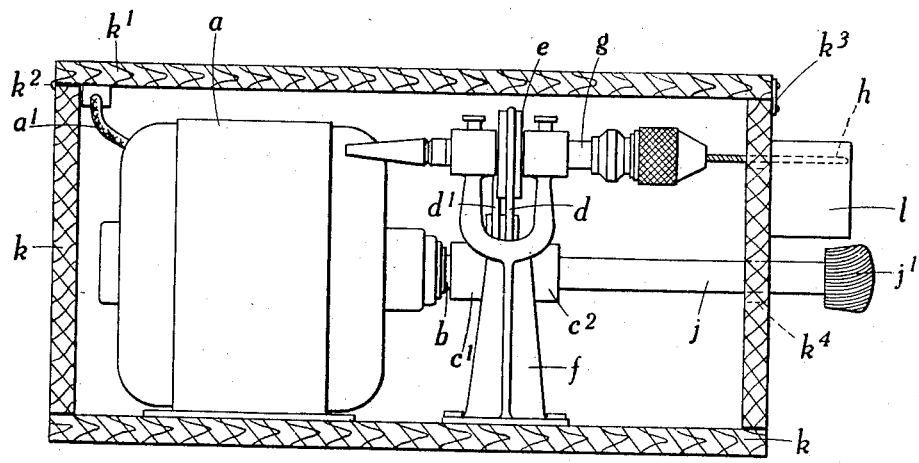
Fig. 2.
Fig. 4.
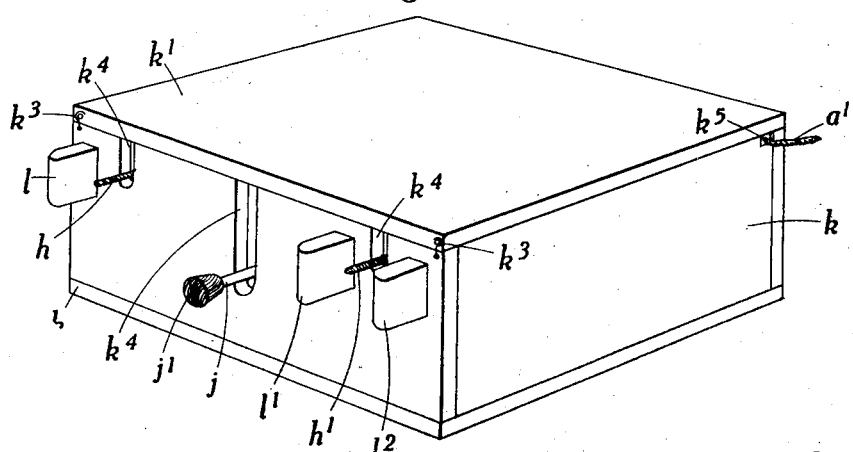
Inventor
Harry H. G. Harwood.
by
William C. Linton.
Attorney Patented Oct. 27, 1942

2,300,046

UNITED STATES PATENT OFFICE 2,300,046

APPARATUS FOR CLEANING POTATOES

Harry Andrew George Harwood,
Liverpool, England

Application January 13, 1940, Serial No. 313,772
In Great Britain January 24, 1939

1 Claim. (Cl. 146—106)

This invention relates to apparatus for cleaning potatoes, and aims to provide a new or improved simple and inexpensive portable apparatus for this purpose which, whilst being adapted to be readily operated and used by unskilled or semi-skilled persons, is primarily designed to substantially reduce the time taken to extract eyes from potatoes—as compared with the use of usual hand operated tools—and also to substantially reduce the waste of the potatoes caused in the removal of the eyes by present methods.

Portable apparatus for cleaning potatoes, according to my invention, comprises a container within and upon which all instrumentalities necessary to the performance of the function are mounted, said instrumentalities consisting of a rotatable drill or tool adapted to remove the eyes from potatoes, a rotatable scraper device adapted to remove the skin from a part or parts of the potatoes not previously removed in the washing of same, a rotatable cutter device whereby unripe or bad parts of the potatoes may be readily cut away, and a common source of power, such as a small electric motor to which the drill, scraper and cutter device are coupled for simultaneous operation, said drill, scraper and cutter device being operable through and accessible at a common side of the container whereat the latter is supplied with guides adjacent to the drill and cutter for aiding in the limitation of their penetration into the substance of the potato.

I will further describe my invention with the aid of the accompanying sheets of explanatory drawings which illustrate, by way of example only, one mode of carrying the invention into effect.

Figure 1:
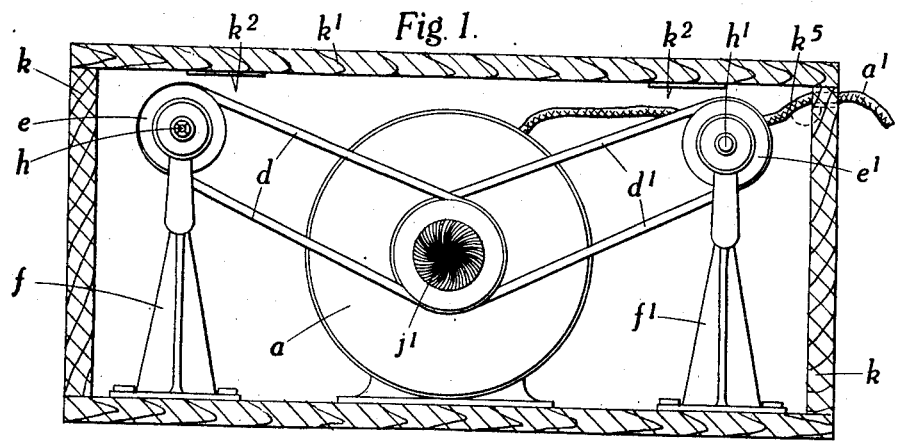
Figure 3:
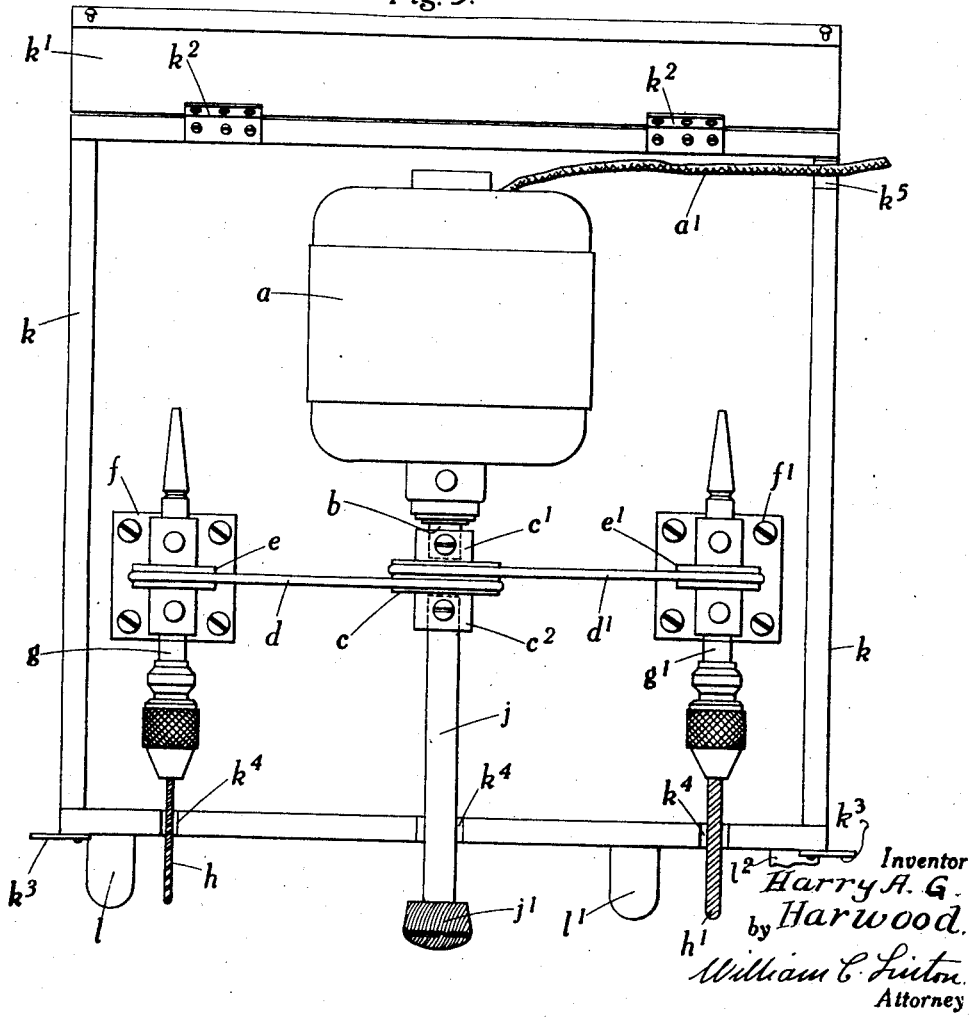

In said drawings:

Fig. 1 is a front view of the apparatus with casing in section,

Fig. 2 a corresponding side view also with casing in section,

Fig. 3 a plan of Fig. 1 but with top lid or cover raised, and

Fig. 4 a perspective view of the apparatus but drawn to a reduced scale as compared with the preceding views.

In the several views like characters of reference denote like or equivalent parts wherever they occur.

Referring to the drawings, $a$ designates a small electric motor to the shaft or spindle $b$ whereof is fitted a boss part $c^1$ of a pulley $c$ provided with double V grooves. By means of suitable belt or like transmissions, such as $d$, $d^1$, said pulley $c$ is arranged to drive pulley wheels $e$, $e^1$ mounted in respective brackets $f$, $f^1$ one on each side of motor $a$. To the spindles $g$, $g^1$ which rotate with side pulleys $e$, $e^1$ are appropriately secured rotatable tools, such as the drills $h$, $h^1$, drill $h$ being smaller in diameter than drill $h^1$; whilst to the central pulley $c$ there is fitted a scraper device which, in this example, is shown in the form of a shaft $j$ provided with a pear-shaped member or extremity $j^1$ having its face serrated or otherwise roughened, shaft $j$ being secured within the other boss part $c^2$ of pulley $c$.

The motor $a$ carrying the scraper device $j$, $j^1$ and the brackets $f$, $f^1$ carrying the drills $h$, $h^1$ are mounted in proximity with each other upon the common floor of and within a wooden box-like casing $k$ to form a unitary structure, the casing $k$ being provided with a displaceable lid or cover $k^1$ hinged at $k^2$ and releasable catches such as $k^3$, $k^3$.

The front wall of casing $k$ is provided with slots $k^4$ wherethrough the operative ends of the rotatable members $h$, $h^1$, $j^1$ extend. A further slot $k^5$ is provided in a side of the casing for passage of the electricity supply cable $a^1$ leading from the motor for connection with the supply source. Said front wall is also provided with spaced guard projections or abutments $l$, $l^1$, $l^2$ designed to shield the rotating exposed parts of the drills and thus protect the hand of the operator in the use of the apparatus as hereinafter described. The projections $l^1$, $l^2$ at each side of the eye-extracting drill $h^1$ also prevent undue penetration of the drill into a potato.

Upon the motor being set in motion, the centre scraper device $j$, $j^1$ and the two outer drills $h$, $h^1$ rotate simultaneously and in removing the eyes from a potato, the latter is held in the hand of the operator and applied to the rotating end of the larger eye-extracting drill $h^1$ of the apparatus, whereupon the eye is removed, the thread of the drill $h^1$ facilitating the removal of the waste portion of the potato.

Owing to the shape of some potatoes, the skin of a part or parts of same is frequently not thoroughly removed or cleansed after washing, such part or parts usually occurring in concavities or recesses in the potato. These part or parts, however, may be readily removed by applying the potato to the serrated or otherwise roughened pear-shaped end $j^1$ of the rotating scraper device, $j$, $j'$.

If a potato has a part unripe or otherwise bad, this may be readily removed by pressing the potato downwardly upon the top of the fine drill $h$, the part of the potato to be removed being situated on the side of drill $h$ adjacent to the guard projection $l$ which may also serve as a stop for contact with the part of the potato being cut away, the screw-threading of the drill functioning to cut the potato similarly as if the potato were pressed onto the edge of a knife.

With the arrangement and disposition of the drills $h$, $h^1$ and scraper device $j$, $j^1$ before described, a potato may be readily moved by an operator from the eye-extracting drill $h^1$ to the cutter drill $h$ or scraper device $j^1$ whichever is required.

It will be obvious that various alterations or modifications may be made to the apparatus described with reference to the drawings without departure from the scope of this invention as defined by the claim. For instance, the scraper device $j$, $j^1$, eye-extracting drill $h^1$ and cutter drill $h$ may be interchanged with their anchorages to respective pulleys, whilst the shaft or spindles of said devices may have screw-threaded or any other suitable connection to said pulleys. Further, although it is preferred to arrange the tools $h$, $h^1$ and $j$, $j^1$ in combination as shown, the eye-remover $h^1$ may be combined with the rotatable scraper device $j$, $j^1$ or with the rotatable cutter device $h$. In either of these examples, however, both rotatable members will be driven from a common source of power, such as the motor $a$.

What I claim as my invention and desire to secure by Letters Patent is:

An apparatus for peeling potatoes comprising a rectangular container open at the top and provided with a hinged closure member for closing said open top, said container being provided with a front wall having a plurality of vertically extending slots formed therein and each being open at its upper end, said closure member when closing said top of the container also covers the upper open ends of said slots, a plurality of spaced parallel motor driven shafts mounted within said container and a motor for driving the same, a potato cutting tool arranged exteriorly of said front wall and having means extending through one of the slots of said front wall, an operative connection between said means and one of the motor driven shafts within the container, said operative connection providing for disconnection and removal of said tool through the open top of the slot when the closure is hinged to open position and an elongated guide fixedly secured to the outer face of the front wall of the container and arranged adjacent said cutting tool to steady the potato and the hand of the operator holding the potato while he subjects the same to the operation of the cutting tool.

HARRY ANDREW GEORGE HARWOOD.